(12) United States Patent
Welker et al.

(10) Patent No.: US 6,570,546 B1
(45) Date of Patent: May 27, 2003

(54) VIDEO DISPLAY CONFIGURATION DETECTOR

(75) Inventors: Mark W. Welker, Spring, TX (US); David W. Engler, Cypress, TX (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 09/183,954

(22) Filed: Oct. 31, 1998

(51) Int. Cl.[7] .................................................. G09G 5/00
(52) U.S. Cl. ........................ 345/1; 345/2; 345/3; 345/7; 345/11; 345/207; 345/903
(58) Field of Search .................. 345/1, 2, 3, 7, 345/11, 207, 903

(56) References Cited

U.S. PATENT DOCUMENTS

| | | | |
|---|---|---|---|
| 4,646,259 A | | 2/1987 | Lincoln et al. |
| 5,068,740 A | * | 11/1991 | Brody .................... 345/903 |
| 5,394,167 A | * | 2/1995 | Migny ..................... 345/1 |
| 5,537,127 A | * | 7/1996 | Jingu ...................... 345/1 |
| 5,663,739 A | * | 9/1997 | Pommerenke et al. ......... 345/1 |
| 5,784,035 A | * | 7/1998 | Hagiwara et al. .......... 345/903 |
| 5,826,035 A | * | 10/1998 | Hamada et al. ............. 345/2 |
| 5,982,392 A | * | 11/1999 | Anfossi et al. ............ 345/2 |
| 5,996,032 A | | 11/1999 | Baker |
| 6,034,733 A | | 3/2000 | Balram et al. |
| 6,067,098 A | | 5/2000 | Dye |

* cited by examiner

Primary Examiner—Richard Hjerpe
Assistant Examiner—Ali Zamani
(74) Attorney, Agent, or Firm—Fleshner & Kim, LLP

(57) ABSTRACT

Monitors for use in a tiled monitor system include adjacent monitor detectors arranged to detect the presence of corresponding adjacent monitor detectors on adjacent monitors so that the physical arrangements of the tiled monitors can be determined without user intervention. Similarly, orientation sensors are provided in each monitor so that their orientation—landscape vs. portrait—can be determined by the monitor without user intervention and reported to the video controller.

23 Claims, 10 Drawing Sheets

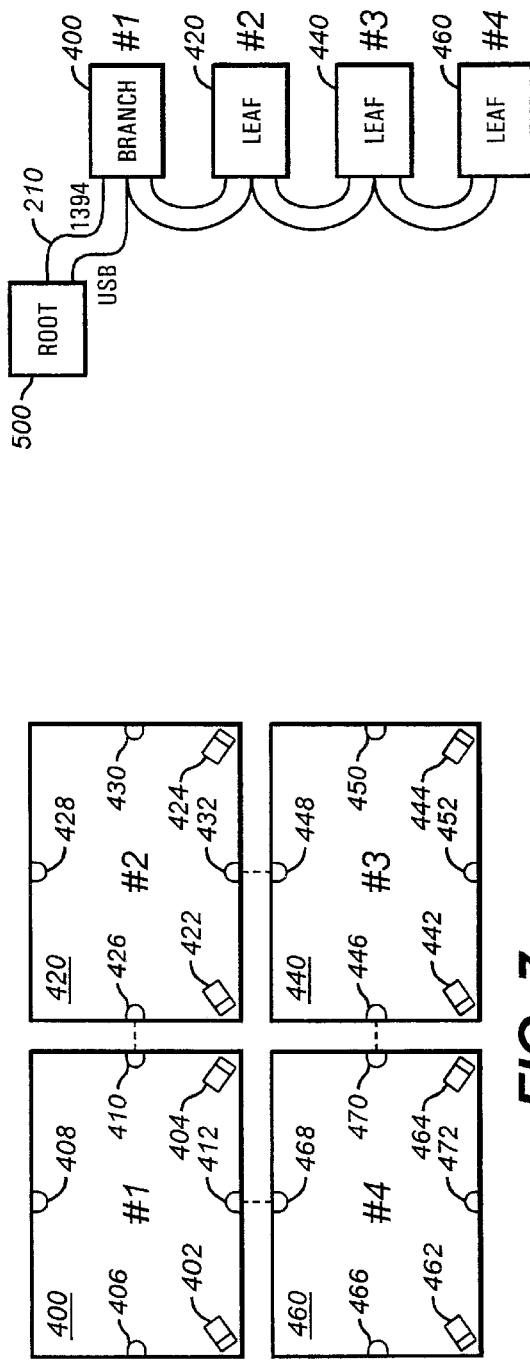
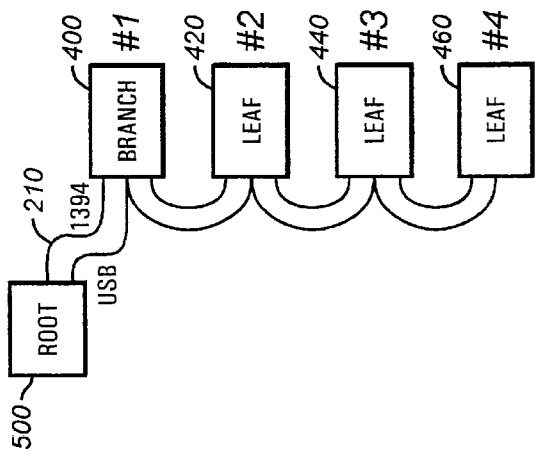
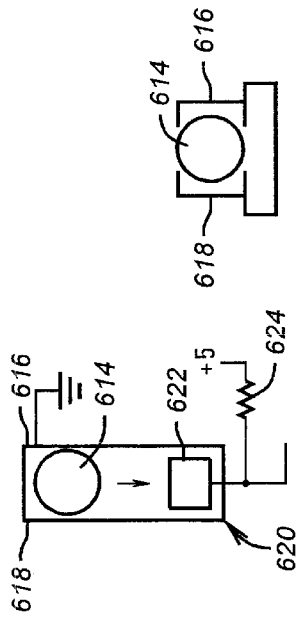
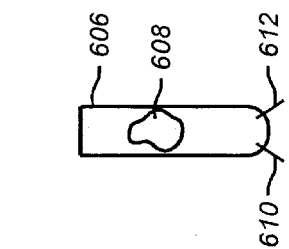
FIG. 7
FIG. 8
FIG. 9A
FIG. 9B
FIG. 9C
FIG. 9D

VIDEO DISPLAY CONFIGURATION DETECTOR

BACKGROUND OF THE INVENTION

1. Field of the Invention

The invention pertains to video monitor systems, and more particularly to a multi-tile display system that detects its physical arrangement.

2. Description of the Related Art

Video monitor systems are well known to the computer field. Originally adaptations of the television, the video monitor originally was a fairly straightforward device. It typically provided a text field of 80×24 characters, with data being received over a serial link and stored as ASCII or other types of codes. A controller would then display those characters on the video screen.

With graphical computing, however, the demands upon monitors increased. Personal computers were implemented with graphics controllers that provided a digital signal suitable for driving the monitor. The graphics controller board typically included video memory for mapping the image to be displayed and a cathode ray tube controller (CRTC) that repetitively read the video memory to provide appropriate digital signals for transmission to the monitor. With the early controllers, the data for each pixel was transmitted as a digital value to the monitor itself. This value was then passed through a digital-to-analog converter, so that an appropriate color was displayed for that pixel. Later, analog signals for each pixel of the image were instead transmitted, such as by using a video graphics adapter (VGA) controller.

With the increasing resolution of monitors, however, the speed of operation of the video controller and the CRTC and the bandwidth of the signal between the video controller and the monitor have entered into play as limiting factors. For example, 1280×1024 resolution addressability monitor running at a 70 Hz refresh rate requires a bus bandwidth of 91.75 MHz pixel data rate. Those in the art will understand that resolution and addressability are often used as interchangeable terms. Increasing the display resolution necessarily results in a higher required data rate.

Further, modem systems sometimes employ multiple monitors for a single computer. Such configurations are sometimes used in concert to display a single image. Generally, however, the physical arrangement of the monitors must be manually configured into the display controller driver. Further, each monitor typically has a corresponding display controller in the computer system.

SUMMARY OF THE INVENTION

In a multi-tiled monitor system according to the invention, each monitor has detectors for determining the presence of adjacent monitors, as well as an orientation sensor to determine whether the monitor is in a portrait or landscape configuration. During set up, the monitors are instructed to transmit to adjacent monitors at an appropriate time, and the other monitors then attempt to detect an adjacent monitor that is transmitting. Using these adjacent monitor detectors, the video controller and associated driver determine the physical arrangement of monitors. In this way, a number of monitors can be "stacked" to form a large virtual monitor, and then automatically set up to display a signal image.

The adjacent monitor detectors and associated transmitters can take many forms. They can be infrared or visible light transmitters and receivers, they can be electrical contacts, they can be mechanical microswitches, radio frequency, or they can even be magnetic transmitters and receivers. Preferably, these adjacent monitor detectors and associated transmitters are coupled via a bus to a controlling computer system, either over the same bus that connects video controller, or, preferably, over lower speed bus such as a universal serial bus. Both buses, however, would typically be implemented in the same physical connection.

BRIEF DESCRIPTION OF THE DRAWINGS

A better understanding of the present invention can be obtained when the following detailed description of the preferred embodiment is considered in conjunction with the following drawings, in which:

FIG. 7 is a diagram illustrating four monitors with their associated adjacent monitor detectors and orientation sensors;

FIG. 8 is a root/branch/leaf diagram of an high speed serial logical arrangement of the monitors of FIG. 7;

FIGS. 9A–9D are alternative implementations of the orientation sensors of FIG. 7;

DETAILED DESCRIPTION OF THE PREFERRED EMBODIMENT

Figure 1:
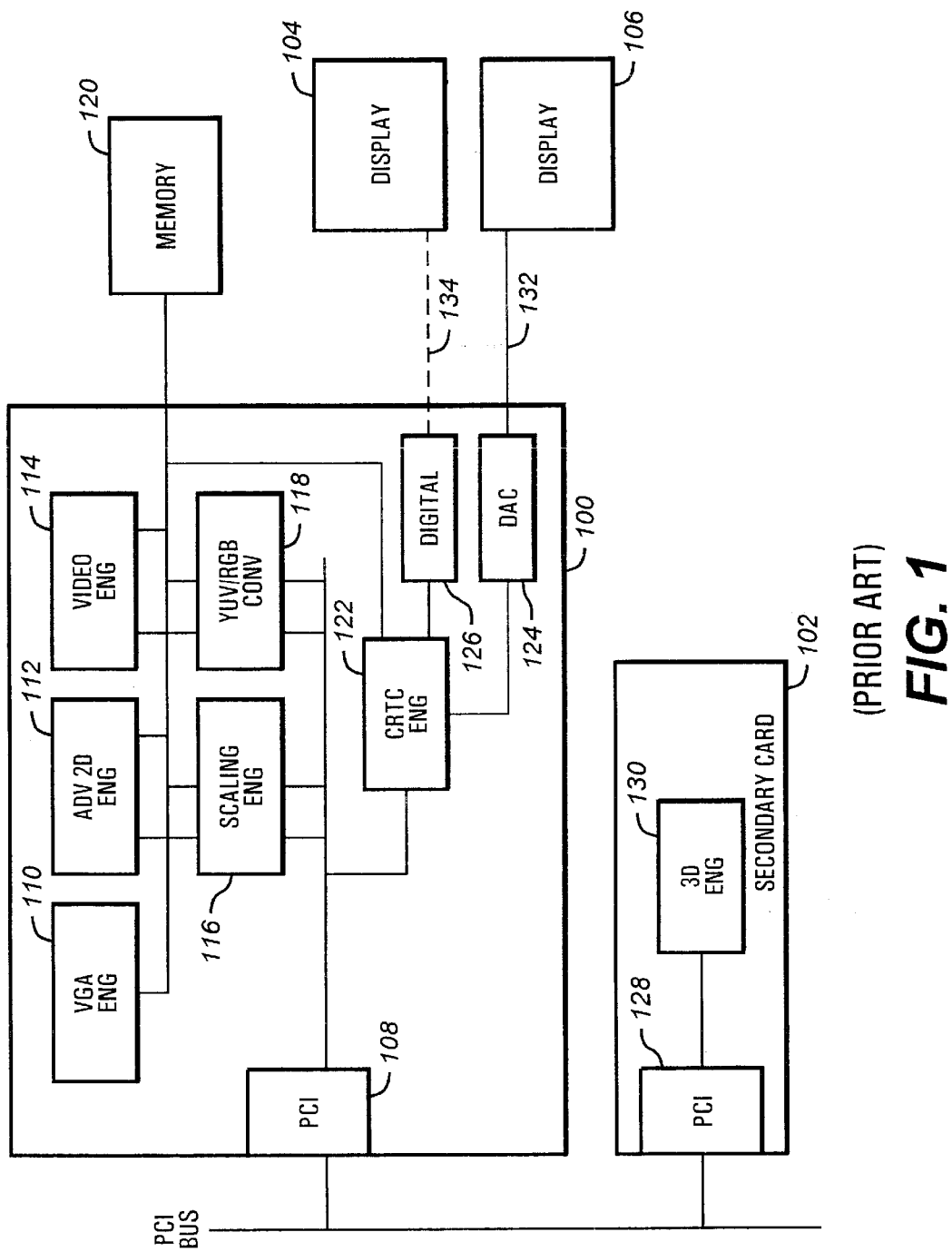
FIG. 1 is a block diagram illustrating a typical component in a standard video controller/display system which uses standard video signals.

Turning to FIG. 1, seen is a typical system previously used to drive multiple displays from a single controller. Shown are a video controller 100 and a secondary graphics engine 102, which control a digital monitor 104 and an analog monitor 106. The video controller 100 typically includes a variety of components, including an interface for a bus, here a PCI interface 108, for receiving data and commands of what should be displayed on the monitors 104 and 106. Also present in the video controller 100 are a VGA engine 110, an advanced 2-dimensional graphics engine 112, a video engine 114, a scaling engine 116, and a YUV/RGB color space conversion engine 118. All of these combine to manipulate graphics data held in a frame buffer memory 120. This memory typically must be at least large enough to hold a representation for each pixel to be displayed on the monitors 104 and 106. This is because a cathode ray tube controller (CRTC) engine 122 continuously accesses the memory 120 and provides a video signal through a digital to analog converter (DAC) 124 or through a digital interface 126 to both the monitor 106 and the monitor 104.

The secondary card 102 typically provides more sophisticated graphics, here accessing the video controller 100 through a PCI interface 128, which provides data to a 3-dimensional graphics engine 130. This engine 130 manipulates data to store 3-dimensional images in the memory 120 via the video controller 100.

As will be appreciated, as the addressability and depth of the monitors 104 and 106 increase, both the size of the memory 120 and the rate at which it is accessed increase. But further, the CRTC engine 122 accesses the memory 120 fast enough not only to provide a single video signal, such as for the monitor 106, but instead fast enough to provide a separate video signal for each of the monitors 104 and 106 that are connected to the video controller 100. This system becomes unwieldy for a large number of monitors, because the memory 120 must be accessed too quickly and must be too large.

Further, when each of the monitors 104 or 106 reaches a certain size and addressability, the bandwidth of a data link 132 and 134 between the video controller 100 and the monitor 104 or the monitor 106 becomes excessive. For large screen displays, it may be desirable to have a addressability of, for example, 4,000 by 3,000 pixels. But using a 60 Hz refresh rate, this requires a pixel bandwidth of over 720 MHz, which is unworkable.

Figure 2:
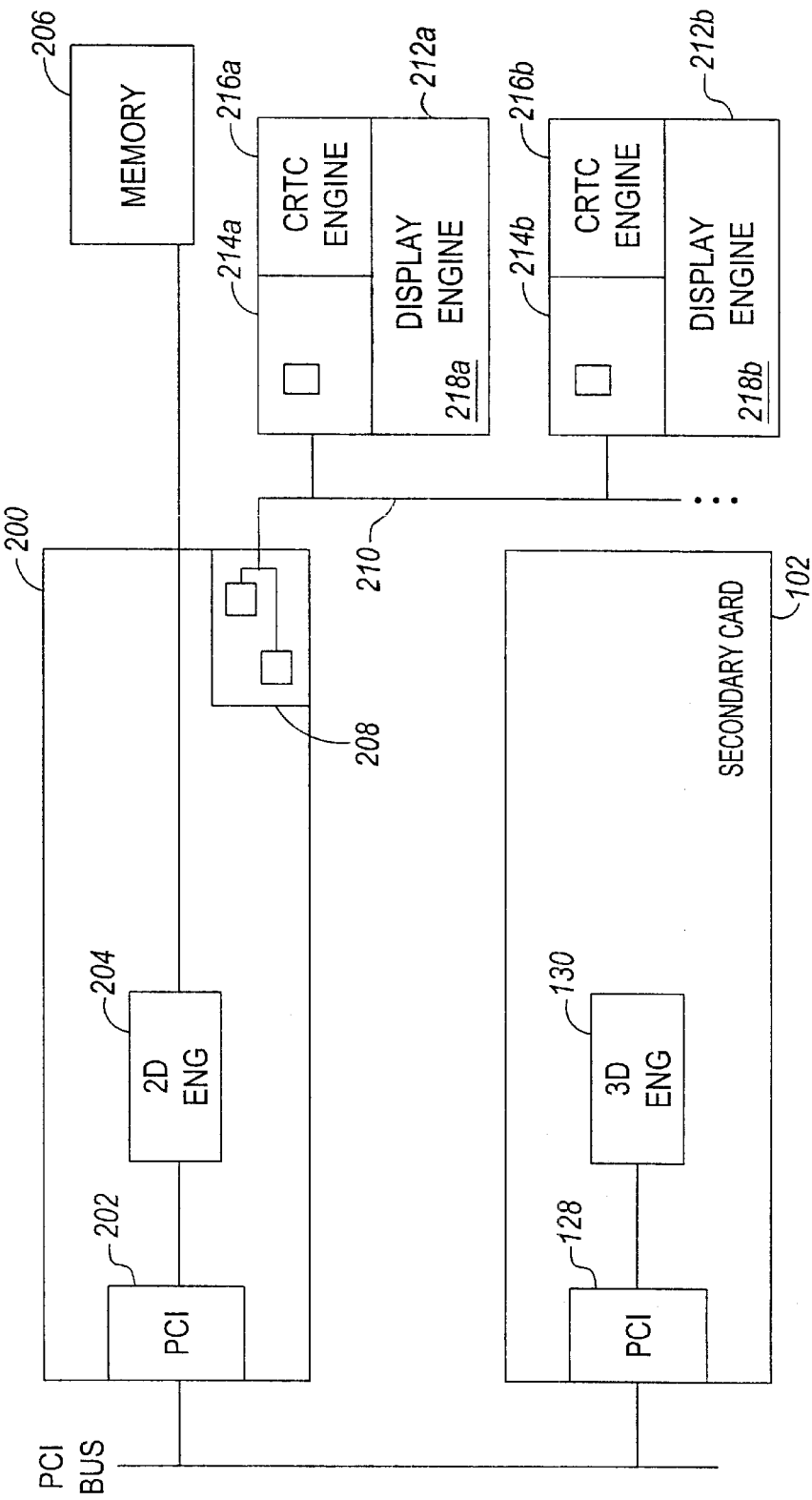
FIG. 2 is a block diagram illustrating the video controller and monitors according to the invention in which the CRTC has been moved from the video controller to the monitor.

So, turning to FIG. 2, illustrated is a computer C with a video system implemented according to the invention that addresses problems discussed in conjunction with FIG. 1. To summarize, the video system of FIG. 2 removes the CRTC 122 from the video controller 100 and instead places a CRTC within the monitors themselves. Then, a high speed serial digital interface between the video controller and each of the monitors only sends data indicating changes in the image to be displayed itself. The video data is stored within memory in the monitor and the video signal for the monitor is generated by the CRTC within the monitor. Further, the data can be compressed and can even be converted to a more efficient (although perhaps "lossy") color space, such as YUV, before being sent to the monitors.

These steps can be advantageous. Assume, for example, that a user intends to "tile" multiple displays into a single virtual display. This can be done using 4, 9, 16, or other square of integers number in a number of displays, for example. If used in this manner, the memory attached to the video controller illustrated in FIG. 2 need not necessarily map every pixel that is to be displayed by all of the monitors together. Instead, it can store image data for one image of a certain resolution, and then each of the monitors displays a portion of that image. Alternatively, the memory does not even store an entire image, instead being used as a scratch pad memory to create packets indicating changes in the image to be displayed. By moving the CRTC to the monitor, the video controller itself need only use a local scratch pad memory to assemble and disassemble packets to and from the monitors. Further, there is no need for constant refreshing of the displays, as this refreshing is handled internally to the monitors. Finally, increasing resolution or color depth could be to some extent localized to the monitor rather than burdening the video controller.

The video system of FIG. 2 can include the secondary card 102 with the 3-D engine 130 and the PCI interface 128, but as discussed above, it further includes a video controller 200 that lacks the CRTC engine 122 of the video controller 100. The video controller 200 typically includes a PCI interface 202, a 2-dimensional graphics engine 204, and may include other components, and interfaces to a memory 206, but instead of using a CRTC engine 122, the video controller 200 provides an alternative high speed interface 208, which can connect to a high speed serial bus such as an IEEE 1394 bus 210. The serial interface 208 ties to the serial bus 210, which is connected to one or more monitors 212, typically in daisy chain format. (Identical components are distinguished using separate letter suffixes.) Each of these monitors 212 include a serial interface 214, and further includes a CRTC engine 216. As is further discussed below in conjunction with FIG. 3, the CRTC engine 216 includes its own frame buffer that generally performs the functionality of the memory 120 of FIG. 1. If the CRTC engine 216 were instead located in the video controller 200, it would have to generate a high bandwidth video signal to all of the multiple monitors 212 to display, for example, 1280×1024 pixel images. By moving the CRTC engine 216 to the monitor 212 itself, the video controller 200 instead only sends changes in the image to be displayed to the monitor 212. The CRTC engine 216 then modifies its frame buffer to reflect those changes, and rapidly scans the memory and displays the stored image using a display engine 218.

Figure 3:
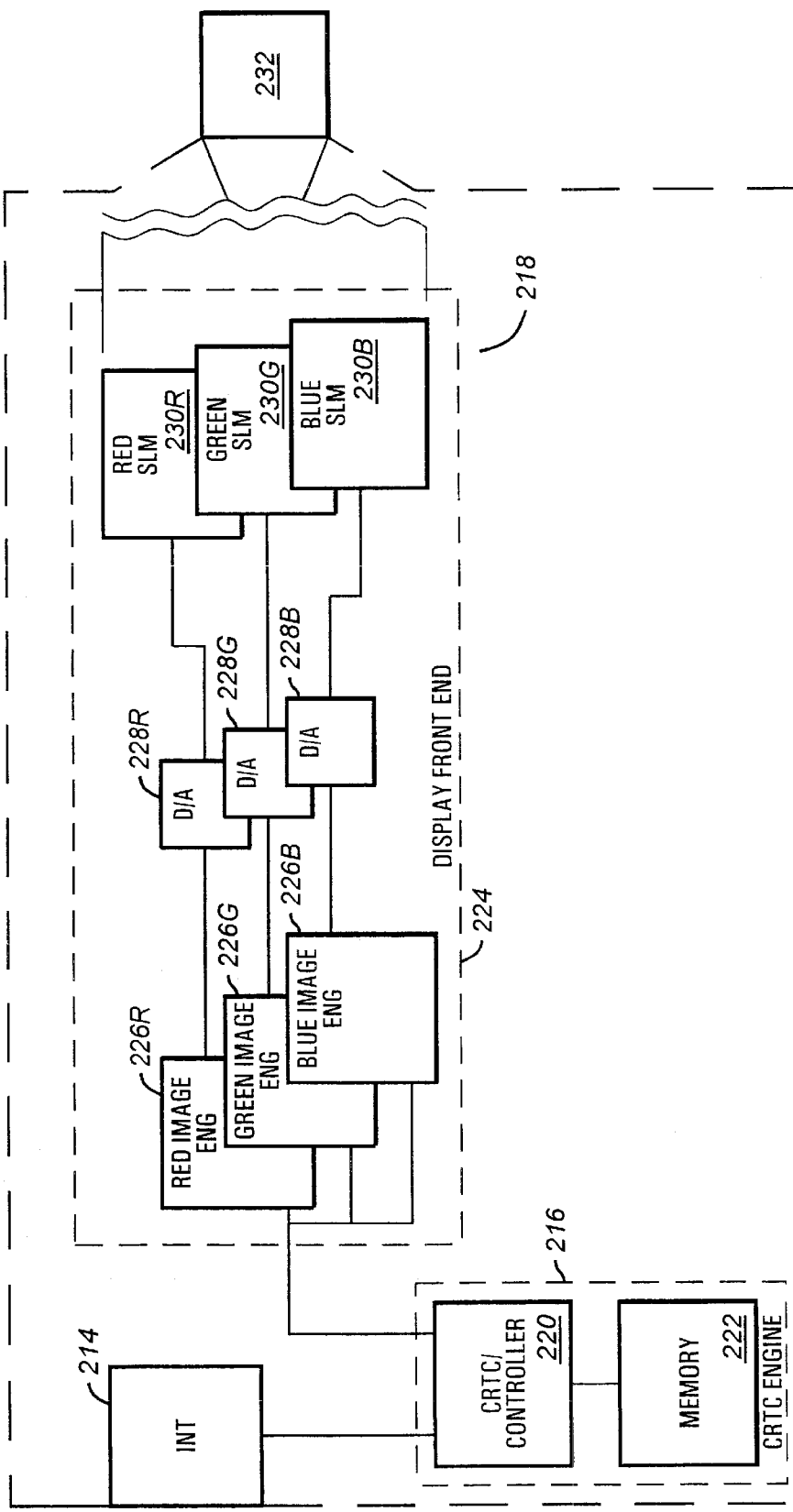
FIG. 3 is a block diagram of further details of the circuitry within the monitors of FIG. 2.

Turning to FIG. 3, illustrated are typical primary components of interest of the monitor 212. The serial interface 214 receives data from the video controller 200 in the form, preferably, of changes to the video image to be displayed. These changes pass to a CRTC/controller 220, where an image within a memory 222 is modified to reflect those changes. The CRTC/controller 220 preferably can be programmed to display a particular portion of the image described by the image change data from the video controller 200.

The CRTC/controller 220 also, however, acts as a CRTC, repetitively reading the image in the memory 222 and passing it as a video signal to a display front end 224, which is a portion of a display engine 218. The display front end 224 could be of a variety of types, and in the disclosed embodiment includes three imaging engines, a red image engine 226R, a green image engine 226G, and a blue image engine 226B. These image engines 226R, 226G, and 226B receive signals from the CRTC/controller 220 and convert them to an appropriate digital signal for each of the three red, green, and blue colors. These signals are passed to three digital-to-analog converts 228R, 228G, and 228B, which provide analog signals that are in turn passed to three spatial light modulators 230R, 230G, and 230B. These spatial light modulators 230K, 230G, and 230B are implemented in an imaging system that ultimately displays an image on a display screen 232. Other variations will be understood, such as using one engine for red and another for color sequential green/blue, or even a single, color sequential engine.

Figure 4:
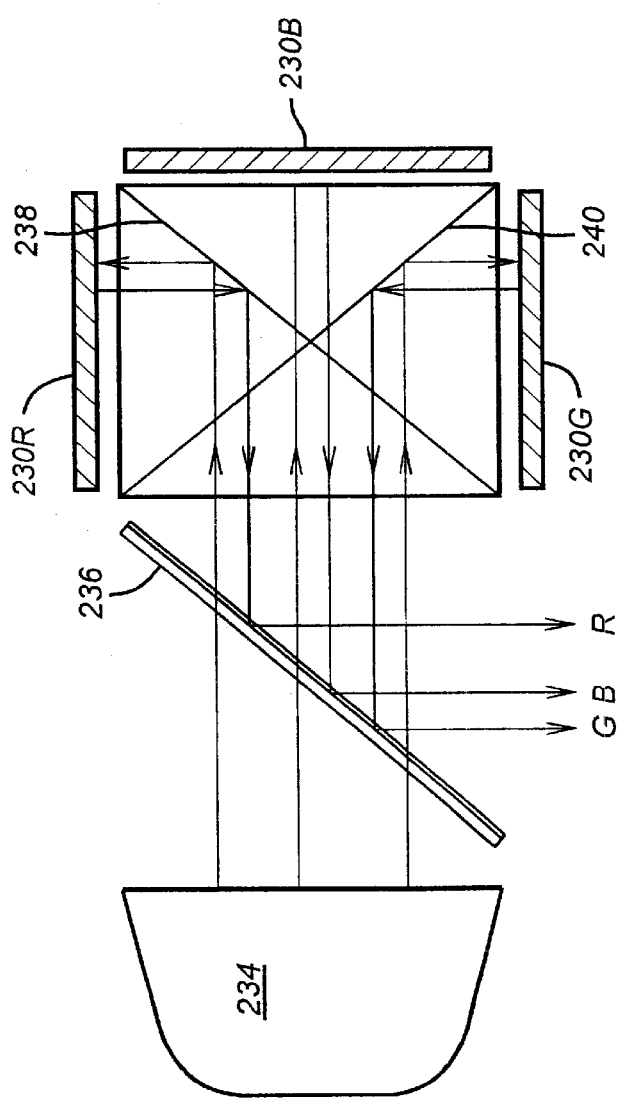
FIG. 4 is an illustration of an appropriate imaging engine for a projection-based video monitor of FIG. 3.

For example, referring to FIG. 4, illustrated is a display engine 218 that could be used in the monitor 212 according to the invention. The system of FIG. 4 implements a light source 234, which provides polarized light to a reflecting polarizer 236. The light is passed to a red reflector 238, and then to a green reflector 240. In this way, red light is directed to the red spatial light modulator 230R, green light is directed to the green spatial light modulator 230G, and blue light is directed to the blue spatial light monitor 230B. The spatial light modulators shift the polarity of the light to form polarized images that are returned and passed through the reflecting polarizer 236, which passes portions of the images to be displayed on to the display screen 232. The system of FIG. 3 can similarly be implemented in cathode ray tube monitors or virtually any other type of display. Using the reflecting polarizing system of FIG. 4, however, a thin, double-reflecting display can be implemented as illustrated as a monitor 242 of FIG. 5. The resulting projection-based system is particularly suited for a multiple monitor system, as is discussed below in conjunction with FIGS. 7 and 11. Although these alternatives are possible, the monitor could be a standard CRT display, or any of a variety of other types of displays.

Figure 6:
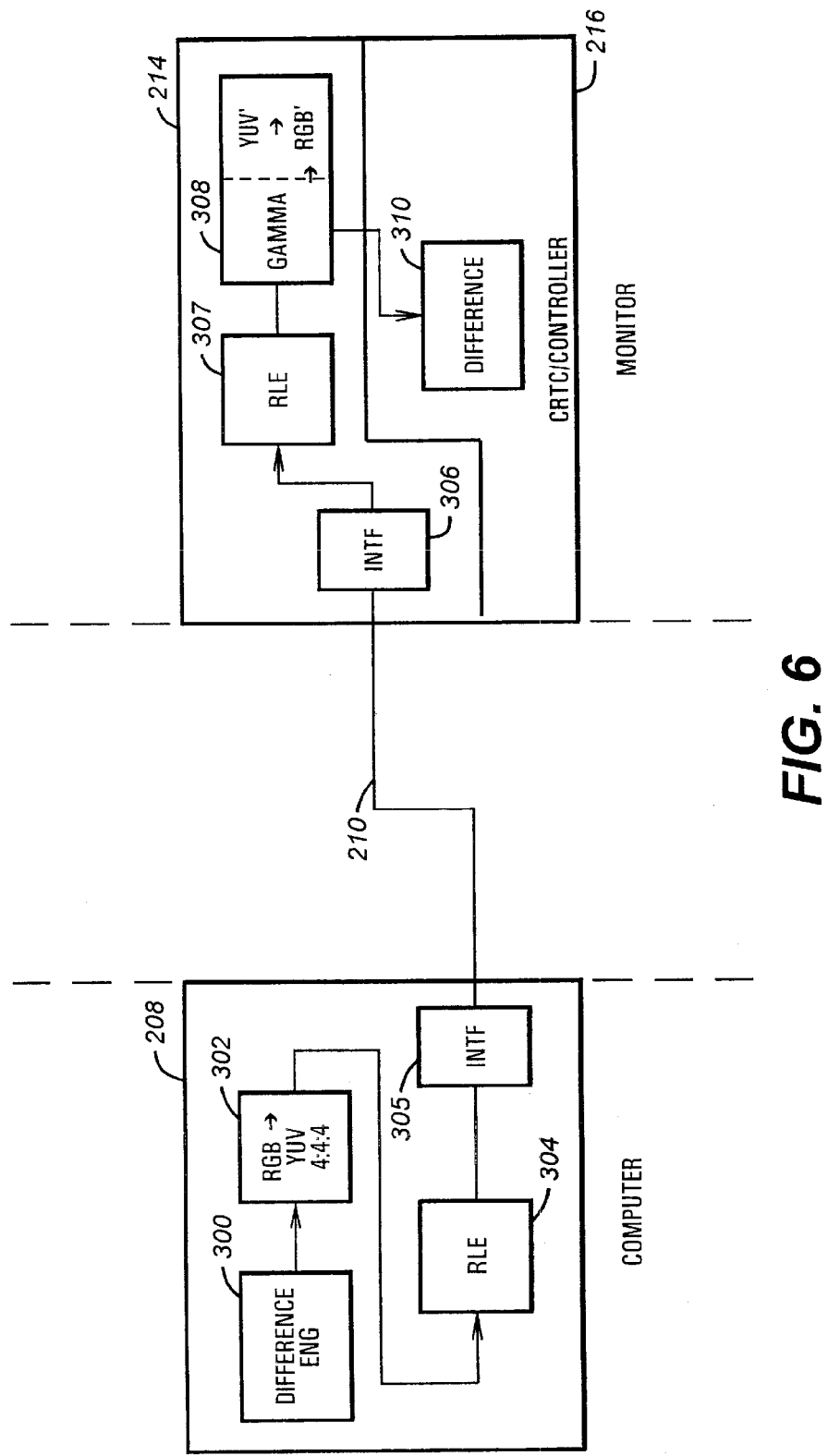
FIG. 6 is a block diagram illustrating the compression and decompression components for communicating between the video controller and monitors of FIG. 2.

Turning to FIG. 6, illustrated are typical portions of the interface 208 and interface 214 of FIG. 2. To reduce the bandwidth of data on the bus 210, preferably something less than the full uncompressed video data is transmitted from the video controller 200 to the monitors 212. To do so, a variety of techniques can be employed, including only providing data that indicates changes in previously displayed data, and compressing the data before transmission, such as using run length encoding. Further, video can be transmitted in a compressed format such as DV video format having 6-1 compression. To further reduce bandwidth, rather than transmitting the data in RGB format, it can be transmitted in YUV format, which uses half the data for an equivalent color depth. The use of YUV format can also reduce the size of a table necessary for gamma correction, needing only 64 kilobytes rather than the 16 megabytes necessary for full 32-bit RGB. Further, even simpler gamma correction (256 byte*3) could be implemented. These are all optional variations.

Specifically, a difference engine 300 calculates changes in the image to be displayed brought about by the 2D engine 204 and other portions the video controller 200. These differences, rather than a full display frame, are to be transmitted to the monitors 212. These differences are further compressed, if desired, by converting the data from RGB format into YUV format or 4:4:4 format, if desired, using four bits for the luminance value and for each of the chrominance values in an optional RGB-YUV engine 302. This data in turn is compressed through standard techniques, such as using run length encoding (RLE) engine 304. Alternatively, or additionally, various other data compression techniques can be used within the interface 208. It will be appreciated that the blocks 300–304 are illustrative only, and other either lossless or lossy techniques for reducing bandwidth could be employed instead or in addition to those shown. Examples include MPEG variations.

This compressed data is passed through a bus interface 305 over the bus 210 to the interface 214 within the monitor 212. Although certain functions are illustrated to be present in the interface 214, and other functions are shown to be present in the CRTC/controller 216, one will appreciate that these functions could be moved from one of these devices to the other. Further, the interface 214 and the CRTC/controller 216 would likely be implemented on a single application specific integrated circuit (ASIC) in any case.

As illustrated, however, the data is received in the interface 214 by a bus interface 306, where it is decompressed, here by an inverse RLE engine 307. This decompressed data could in YUV format, where it is passed first to a gamma correction engine 308. Because the data is still in YUV format, only needing 16 bits per pixel, only 64K bytes of memory is necessary for the gamma correction table, rather than the 16M bytes that would be necessary for full 32-bit RGB data. This gamma corrected YUV data YUV' is converted to gamma corrected RGB data RGB', which is then passed to a difference engine 310 within the CRTC/controller 216. This engine 310 causes appropriate changes to be made in the memory 222 of the CRTC engine 216 within the display 212.

Further, although the data path of FIG. 6 and illustrated in FIG. 2 is shown transmitting data from the interface 208 to the interface 214, it will be appreciated that the 1394 bus 210 is a bidirectional bus, so data could be transmitted back to the video controller 200 or to other devices within a computer system as well. This bidirectional capability could be used for the automatic configuration capability of the monitors 212 discussed below (see FIGS. 7–10).

Figure 5:
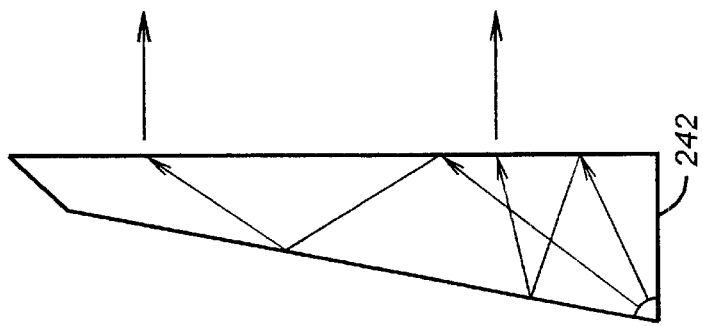
FIG. 5 is a side cutaway view of a monitor according to FIGS. 3 and 4.

In addition to the capability to control multiple monitors 212, the system according to the invention also provides automatic detection of both the orientation and placement of multiple monitors so that they can appear as a single, large, multi-tiled monitor. This is especially advantageous when implemented with a projection style monitor 242 as illustrated in FIG. 5, because such displays can project an image virtually to the edge of the physical monitor. Thus, using such monitors, a multi-tiled monitor effectively appears as a single monitor.

To provide for automatic configuration of multiple monitors, displays implemented according to the disclosed embodiment are outfitted with orientation sensors and with transmit and receive adjacent monitor detectors for detection of the arrangement of the individual monitors, or "tiles." Referring to FIG. 7, shown is a typical four-tile configuration according to the disclosed embodiment. A first monitor 400 is shown with two orientation sensors 402 and 404 and four adjacent monitor detectors 406, 408, 410, and 412. (Only one diagonal orientated sensor, however, is necessary.) A second monitor 420 similarly includes two orientation sensors 422 and 424, and four adjacent monitor detectors 426, 428, 430, and 432. A third monitor 440 and a fourth monitor 460 similarly include orientation sensors 442, 444, 462, and 464, and adjacent monitor detectors 446, 448, 450, 452, 466, 468, 470, and 472. The adjacent monitor detectors can be physical conductors, which would allow transmission of a fairly low bandwidth signal, such as over the equivalent of a USB, I²C bus, or instead infrared LEDs, optical LEDs, microstamps, magnetics, radio frequency, or other suitable technology. Further aspects of appropriate adjacent monitor detector technology is discussed below in conjunction with FIGS. 13 and 14A–14B. Basically, the adjacent monitor detectors are transmitter/receivers that are coaligned with similar adjacent monitor detectors in adjacent monitors allowing simply code or signals to be sent between the tiles.

For each of the monitors 400, 420, 440, and 460, an interface such as either the 1394, such as discussed in conjunction with FIGS. 2, 3, and 6, or a universal serial bus (USB), receives commands from a video controller instructing that monitor to activate or read its detectors. In one embodiment, all transmitters are simultaneously energized on a particular monitor, although each could be individually addressed as well for more sophisticated implementations, particularly for handling a large number of monitors. When a computer system desires to configure the monitors 400, 420, 440, and 460 so that they effectively appear as a single monitor, the video controller 200, for example, sends a series of commands addressing each of the 1394 interfaces on each monitor 400, 420, 440, and 460 in sequence. These commands instruct each to in sequence turn on its presence transmitter, and the others to read their adjacent monitor detectors. Based on the returned information, the physical arrangement of the monitors 400, 420, 440, and 460 is determined. An algorithm for performing this task is further discussed below in conjunction with FIG. 10.

FIG. 8 shows the logical association of the serial bus's 210 branch and leaves as they would be attached in FIG. 7. A "root" is typically a controller on the bus, a "branch" is any node which is connected to more than one other node, and a "leaf" is a bottom-most node on the bus. Referring to FIG. 8, it is seen that the monitor 400 is configured as a branch, and the remaining monitors 420, 440, and 460 are configured as leaves. There is no special significance to this particular configuration, as they depend to some extent on the type of serial bus 210. In any case, each mode has its own unique address and is addressed by a root 500 as discussed below in conjunction with FIG. 10. Further, the monitors 400, 420, 440, and 460 are also preferably coupled by a bus other than the serial bus 210. For example, a lower speed Universal Serial Bus (USB) 510 is shown connecting the monitors 400, 420, 440, and 460. The USB 510 can be used to carry side band control information without encumbering the high speed bus. Further, both buses are preferably implemented as part of the same connector. Alternative buses could be employed, or in-band signaling over the high speed bus.

As part of the configuration sequence, the resolution, size, other details, and the orientation of each of the monitors 400, 420, 440, and 460 is returned to the root 500, which in this case would be the video controller 200. This could be done over the 1394 bus or, preferably, over the USB 510. The orientation of the monitors 400, 420, 440, and 460 is determined by one of a variety of either mechanical or non-mechanical means. Illustrated in FIG. 9A, a ball 600 is located within a track 602 such that the ball 600 impacts a microswitch 604 when oriented in a particular manner. Alternatively, in FIG. 9B, a vial contains mercury 608, which closes two contacts 610 and 612. FIG. 9C illustrates yet an alternative embodiment. In this embodiment, a ball 614 resides between two tracts 616 and 618, and slides up and down the tracks. The ball 614 is preferably of a conductive surface, and when it travels to a distal end 620, it causes a short between ground and a 5 volt conductor 622, which is coupled to five volts via a resistor 624. Thus, a signal is pulled low when the ball 614 travels to the distal end 620. This embodiment of FIG. 9C is also illustrated in a cut-away view in FIG. 9D, showing the two tracks 616 and 618 with the ball 614 in the middle. Other variations are possible. By placing at least one of these illustrated orientation sensors within the monitors 400, 420, 440, and 460, such as the orientation sensor 402 in the monitor 400, it can be determined whether the monitor is in portrait or landscape configuration. If the monitor 400 could be in more than these two orientations, the second orientation sensor 404 can be provided, which can uniquely determine which of the four sides of the monitor 400 is up.

Referring back to FIG. 3, preferably the CRTC/controller 220 includes the additional circuitry (such as the USB 510) for providing an interface to the adjacent monitor detectors and orientation sensors. Such circuitry would typically employ a driver circuit and a sensor circuit, and the CRTC/controller 220 could further implement the simple binary communications protocol that can be used over the adjacent monitor detectors. The details of such an implementation would be understood by those skilled in the art. Further, it will be appreciated that the 1394 interface 214, or other circuitry, could instead implement the electronics necessary to communicate with the orientation sensors and the adjacent monitor detectors.

Figure 10:
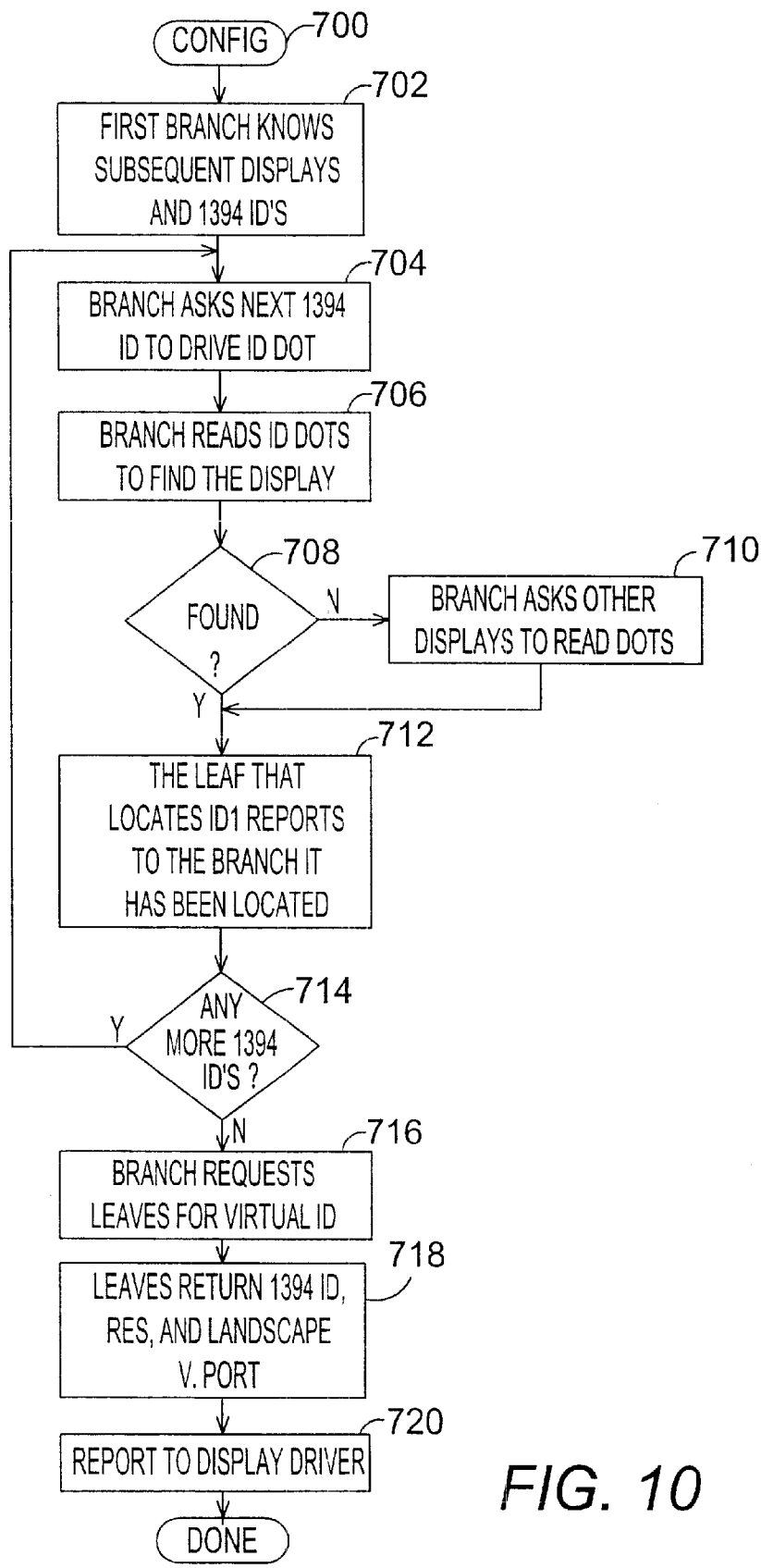
FIG. 10 is a flow diagram illustrating the method used to determine the physical arrangement of monitors illustrated in FIG. 7.

Turning to FIG. 10, shown is one configuration algorithm that could be employed by a system implementing multiple monitors, such as the four monitors 400, 420, 440, and 460 of FIG. 7. This method 700 begins at a step 702, where the first branch, here the monitor 400, knows the subsequent monitors 420, 440, and 460 and their 1394 identifications. (Typically, the computer C actually performs the identification and configuration, but for illustrative purposes, one monitor is illustrated as having this capability.) The branch monitor 400 asks the next 1394 ID (beginning with ID1) to drive its adjacent monitor detectors. Assuming the second monitor 420 is ID1, it will then drive its adjacent monitor detectors 426, 428, 430, and 432. Proceeding to step 706, the branch monitor 400 reads its own adjacent monitor detectors to attempt to find the monitor (here the monitor 420) that has turned on its adjacent monitor detectors in step 704. Therefore, the branch monitor 400 reads its adjacent monitor detectors 406, 408, 410, and 412, and determines its transmit/receive adjacent monitor detector 410 has sensed the presence of the second monitor 420, because the transmit/receive adjacent monitor detector 426 of the monitor 420 is transmitting. Therefore, proceeding to step 708, it is determined that the branch monitor 400 has found an active adjacent monitor detector. If the branch monitor 400 had not found an active adjacent monitor detector, control would instead proceed to step 710, where the branch monitor 400 would ask the other monitors 440 and 460 to read their adjacent monitor detectors in an attempt to locate the second monitor 420. But in this case, control proceeds instead from step 708 to step 712, where the leaf monitor that locates the transmitting monitor reports to the branch monitor 400 that the transmitting transmit/receive adjacent monitor detector has been located (in this case, no leaf monitor 420, 440, or 460 will so report because the branch monitor 400 has never asked the other monitors 420, 440, or 460 to read their adjacent monitor detectors in step 710).

Proceeding to step 714, if there are any additional IDs to test, control loops to step 704. In this case, there are other IDs (for the other monitors 440 and 460) so control loops. Illustrative is what happens when the third monitor 440 is asked to drive its adjacent monitor detectors. In that case, the branch monitor 400 reads its adjacent monitor detectors at step 706, but at step 708 has not found the third monitor 440. The branch monitor 400 then asks the other monitors 420 and 460 to read their adjacent monitor detectors, and in step 712, the second monitor 420 will report that it has read the presence of the third monitor 440 below it, as sensed by the transmit/receive adjacent monitor detector 432. The fourth monitor 460 can also report the presence of the third monitor 440 through sensing the presence indicated by the transmit/receive adjacent monitor detector 470.

When all of the IDs have been interrogated, the arrangement of the monitors 400, 420, 440, and 460 illustrated in FIG. 7 is known. This detection can of course be performed for more than four monitors, being extendable to sixteen, twenty-five, or any other number of displays, including non-rectangular configurations. Further, it is not necessary that the monitors actually be arranged in a square configuration.

When all of the IDs have been checked, control proceeds to step 716, where the branch monitor 400 asks each of the leaf monitor 420, 440, and 460 for their virtual identification. Proceeding to step 718, when the leaves return their virtual IDs, they also return their 1394 ID, their resolution, their orientation (landscape vs. portrait) as indicated by each of their orientation sensors, and any other information that would be helpful to the video controller 200 and an associated driver. Proceeding to step 720, the root 500, here the video controller 200, reports information to the display driver. At this point, the set-up is complete. The driver can report either one large display or multiple displays available along with their resolutions. This should then be available for set-up by the user.

Figure 11:
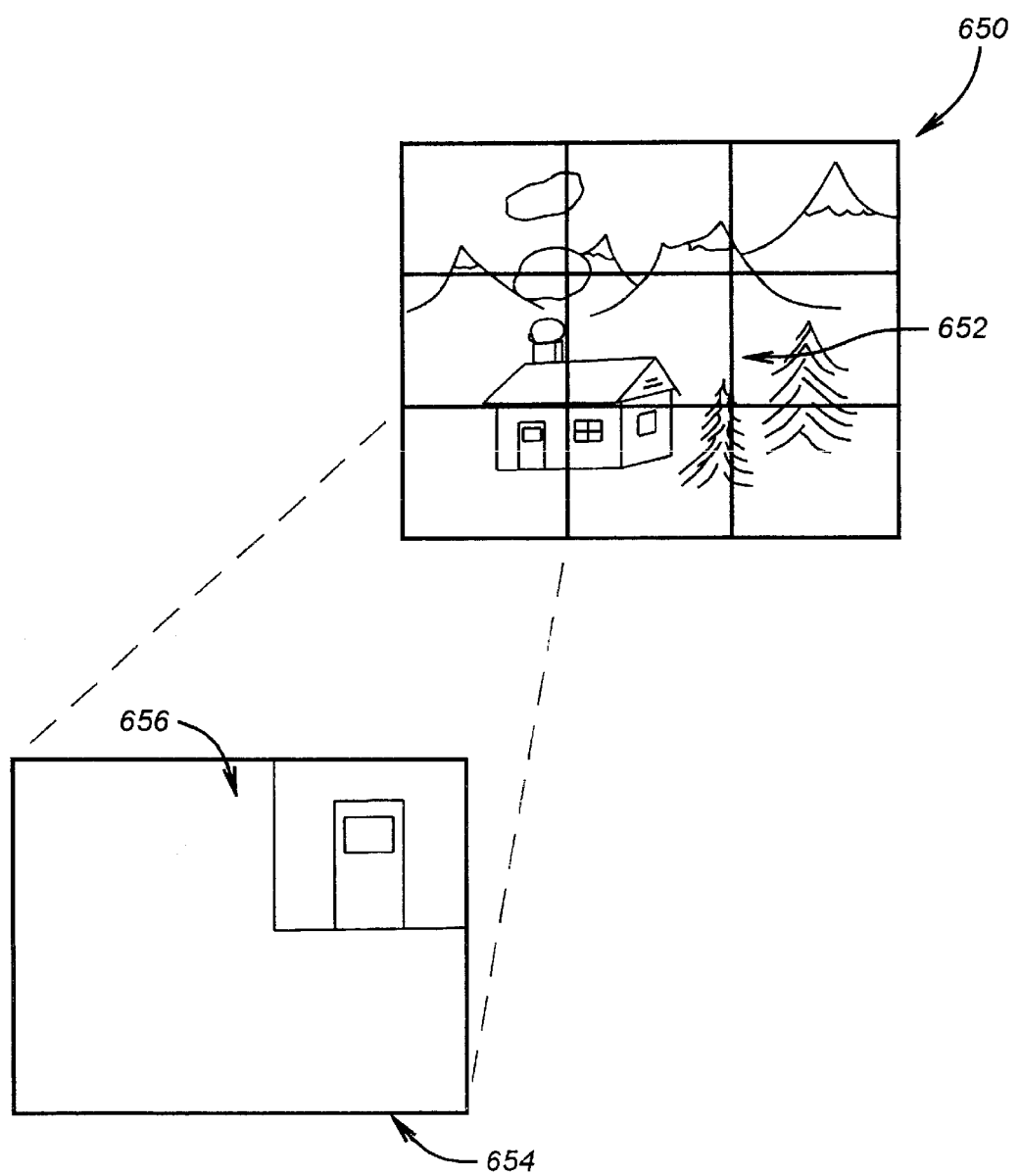
FIG. 11 is a diagram illustrating a nine-monitor single-image configuration, as well as the portions of those images displayed by each monitor.

Turning to FIG. 11, illustrated is a nine-monitor arrangement 650 used to display a single image 652. Referring back to FIG. 2, it will be appreciated that a driver in a computer system may only be generating the image in a 640×480 pixel resolution, or some other standard resolution for a single monitor. Instead of the software driver, and even the video controller 200, being required to convert this standard resolution into the relatively high resolution ultimately illustrated in FIG. 11, each monitor 212 can parse the portion of the image 652 that it is required to display, convert it to an appropriate resolution, and store it within its own memory 222 at whatever resolution is preferred for that particular monitor. Thus, referring to a single monitor 654 at the lower left-hand corner of the array of monitors 650, that monitor 654 may have an actual resolution of 640×480 pixels, with an actual portion of an image that it displays 656 having a third of that resolution. The CRTC/controller 220 can be instructed by the video controller 200 that it is only to display a particular portion of the image which is actually transmitted over the bus 210. In this way, standard driver software can be used, with an arbitrary number of actual monitors being used to display the developed image.

Figure 12:
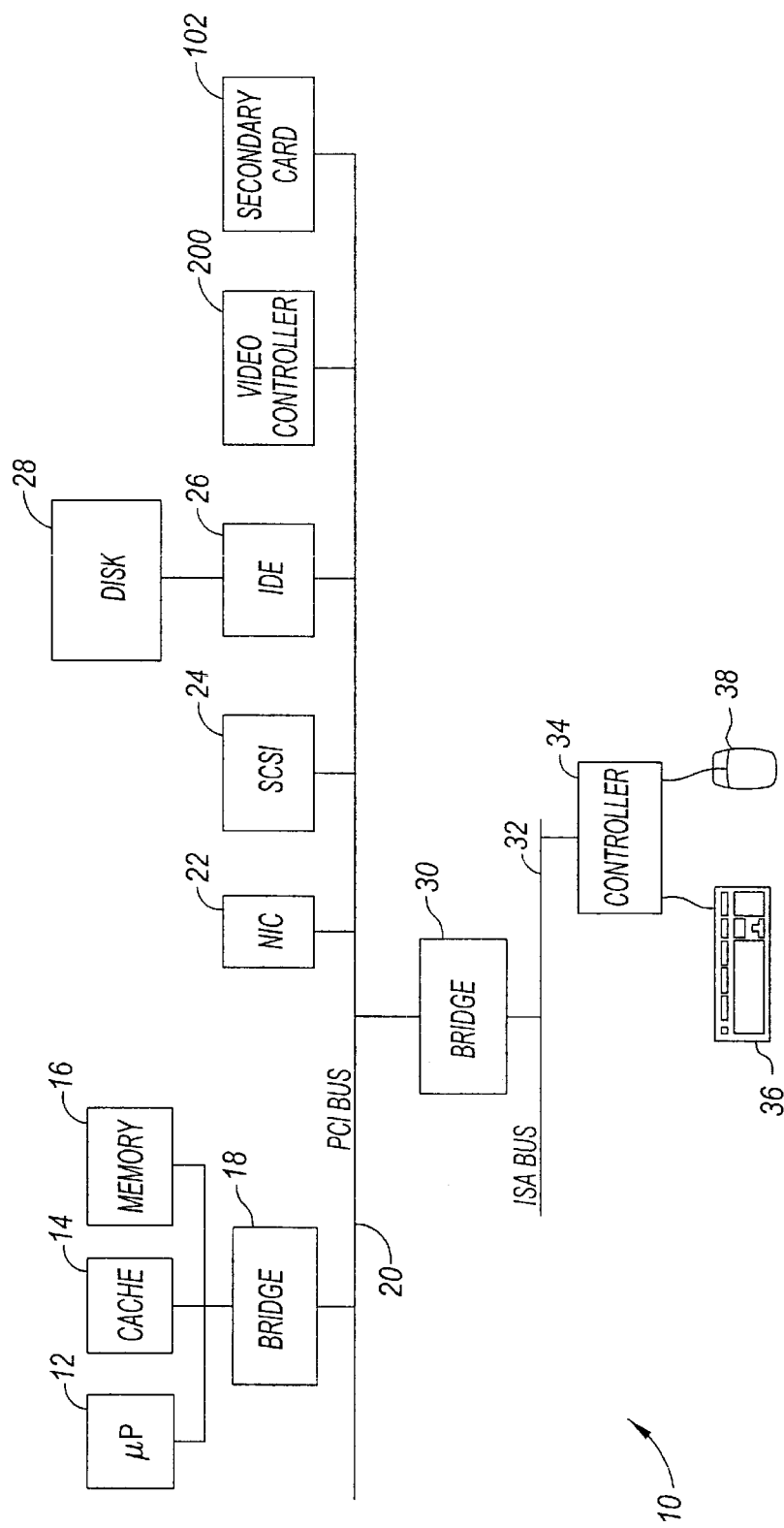
FIG. 12 is a block diagram illustrating components of a typical computer system which would be implemented using the techniques according to the invention.

Turning to FIG. 12, illustrated is a typical computer system in which the video controller 200 would be implemented. A computer system 10 includes a microprocessor 12, a level two cache 14, and a memory 16. This is all coupled via a bridge 18 to a PCI bus 20, which includes a network interface card (NIC) 22, a SCSI controller 24, and an IDE controller 26. The IDE controller 26 is in turn coupled to a disk storage system 28. The video controller 200 and secondary card 102 are on the PCI bus 20. A bridge 30 also couples the PCI bus 20 and an ISA bus 32. A controller 34 on the ISA bus 32 attaches a keyboard 36 and another I/O device such as a mouse 38 to the system. This illustrates the basic components of the system, but of course a wide variety of other configurations are possible.

Figure 13:
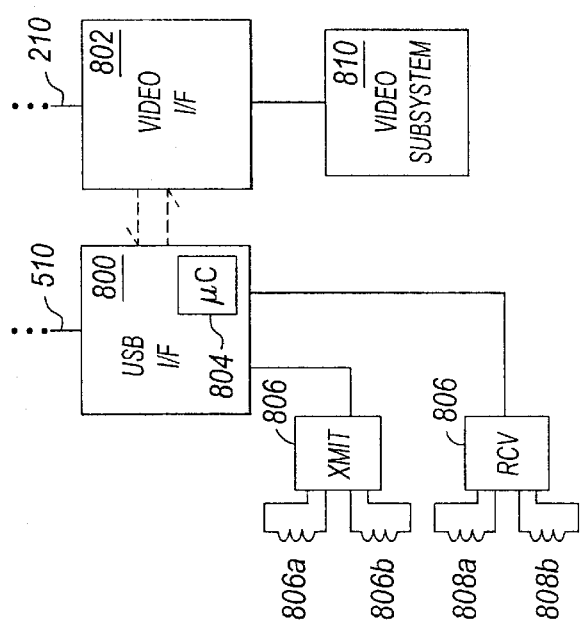
FIG. 13 is a block diagram illustrating further details of the transmit and receive nature of the adjacent monitor detectors as well as corresponding interfaces to a couple of those detectors to a computer system.

Turning to FIG. 13, illustrated is a block diagram showing how the various monitors of FIG. 8 would be configured employing a USB interface 800 in conjunction with the video interface 802. The USB interface 800 is shown including a small microcontroller 804 which provides a variety of functions. Among these functions are the control of a pair of adjacent monitor detector transmitters 806 and a pair of adjacent monitor detector receivers 808. These are implemented as magnetic transmitters 806*a* and 806*b* and magnetic receivers 808*a* and 808*b* in each monitor. In one configuration, each monitor can contain two transmitters 806*a* and 806*b*, for example on the bottom and the left of the monitor, and two receivers 808*a* and 808*b*, for example on the top and the right of the monitor, which communicate with the adjacent adjacent monitor detector transmitter and receivers of adjacent monitors. Also shown in FIG. 13 is the video subsystem 810, coupled to the video interface 802. This drives the video display of the monitor in which the adjacent monitor detector transmitters 806 and adjacent monitor detector receivers 808 are incorporated.

Figure 14B:
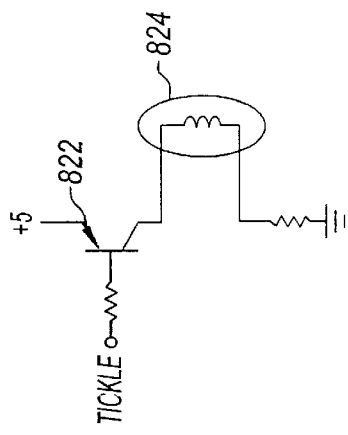
FIG. 14B is a block diagram that further details typical circuitry for an adjacent monitor detector transmitter for use with the adjacent monitor detector receiver of FIG. 14A.
Figure 14A:
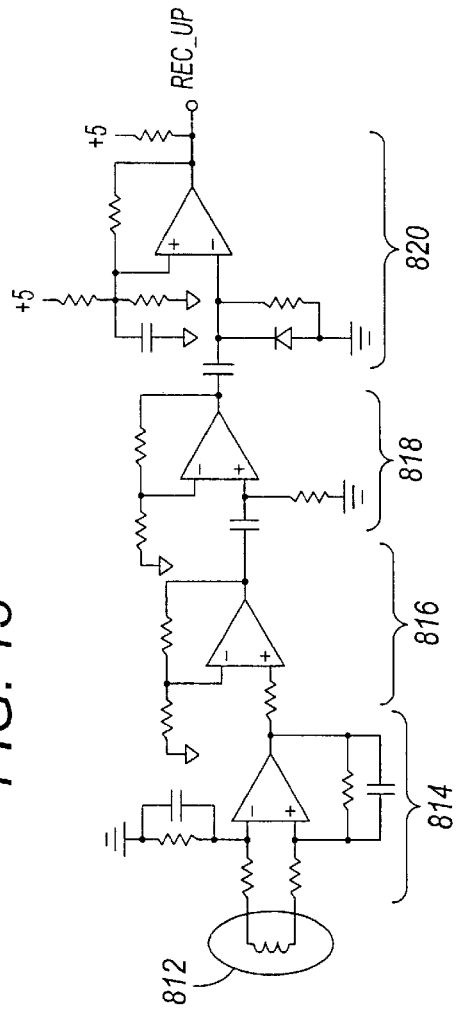
FIG. 14A is a block diagram illustrating typical circuitry for an adjacent monitor detector receiver to receive rf signals.

Illustrated in FIG. 14A is a typical receiver circuit for use with each of the adjacent monitor detector receivers 808. Shown is an antenna 812 which would preferably be placed near the particular side of the monitor at which to detect an adjacent monitor. This is provided to a number of amplifier stages and filters 814, 816, 818, and 820, which provide a receiver active signal REC_UP.

FIG. 14B illustrates a typical transmitter that can be used as the adjacent monitor detector transmitter 806. It receives a signal TICKLE from the microcontroller 804, from which a transistor 822 is switched. This in turn causes a signal to flow through a transmit antenna 824. While appropriately toggling the TICKLE signal, the microcontroller 804 causes the transmitters 806 to send a predetermined signal. It will be appreciated that amplitude modulation, frequency modulation, or other signaling techniques could be used to improve noise rejection. Further, the actual transmit and receive operations would preferably be handled by the microcontroller 804 upon a command from a host driver, such as the computer system 10. The host driver would then do the analysis of whether adjacent monitors are present. Alternatively, the controller could provide the transmission of a burst, with the receivers including a latch. Then, the reading of each latch would also clear it.

In any case, referring back to FIGS. 7, 8, and 10, an alternative algorithm for detecting adjacent monitors would be to drive each transmitter, such as the transmitters 806*a* and 806*b* one-by-one for each of the monitors upon command from the host computer 10. When each transmitter is driven, all of the receivers, such as the receivers 808*a* and 808*b*, are sequentially checked. This is repeated for each transmitter, allowing a map to be created of what monitors are adjacent to what monitors. For more flexible configuration, it may be desirable to provide four transmitters and four receivers, for example, one on each side of a particular monitor.

This implementation allows the monitors to be set up without holes for infrared or light transmitters and receivers, and without mechanical or electrical contacts. Further, it tends to be less location sensitive than other implementations. Further, the location of the adjacent monitor detector transmitter and receivers can be adjusted, such as putting them on a diagonal corner of the monitor, rather than centered on the side, a top, or a bottom.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

For example, although a 1394 bus has been illustrated as the high speed serial link, a variety of other serial or other parallel links could instead be used. Similarly, the exact location of the various implemented circuitry is not critical and could be located in different particular integrated circuit chips or boards within the monitors according to the invention. Further, the exact physical orientation of sensors and adjacent monitor detectors are similarly not critical, and could be implemented in a variety of ways known to the art. Further, the adjacent monitor detectors themselves could be further used for communication among the monitors if that were deemed to be desirable. Finally, a variety of types of display systems could be used other than the illustrated projection system and the discussed CRT system without detracting from the spirit of the invention.

What is claimed is:

1. A video monitor system comprising at least one video monitor that is capable of detecting its location with respect to other video monitors, the at least one video monitor comprising:

a display screen that displays an image; and an adjacent monitor detector receiver disposed at a predetermined position with respect to the display screen, the adjacent monitor detector receiver being adapted to detect the presence and position of an adjacent video monitor with respect to the display screen in response to a signal received from the adjacent video monitor.

2. The video monitor system of claim 1, wherein the adjacent monitor detector receiver detects infrared transmissions.

3. The video monitor system of claim 1, wherein the adjacent monitor detector receiver detects visible light transmissions.

4. The video monitor system of claim 1, wherein the adjacent monitor receiver is a conductor that detects an electrical signal.

5. The video monitor system of claim 1, wherein the adjacent monitor detector is a microswitch.

6. The video monitor system of claim 1, further comprising:

an adjacent monitor detector transmitter located at a second predetermined position with respect to the display screen, wherein the adjacent monitor detector transmitter transmits a signal detectable by an adjacent monitor's adjacent monitor detector receiver.

7. The video monitor system of claim 6, wherein the video monitor further comprises:

a second, adjacent monitor detector transmitter and a second adjacent monitor detector receiver.

8. The video monitor system of claim 7, wherein the adjacent monitor detector transmitters and receivers are arranged respectively on four sides of the video display.

9. The video monitor system of claim 6, wherein the adjacent monitor detector transmitter is an infrared transmitter.

10. The video monitor system of claim 6, wherein the adjacent monitor detector transmitter is a visible light transmitter.

11. The video monitor system of claim 6, wherein the adjacent monitor detector transmitter is an electrical transmitter.

12. The video monitor system of claim 6, wherein the adjacent monitor detector is an electrical transmitter.

13. The video monitor system of claim 6, further comprising:

a microcontroller that controls the adjacent monitor detector transmitter.

14. The video monitor system of claim 13, wherein the microcontroller communicates to a host computer over a serial bus.

15. The video monitor system of claim 14, wherein the serial bus is a Universal Serial Bus.

16. The video monitor system of claim 1, further comprising:

at least one orientation sensor that senses whether the video monitor is in a portrait or landscape orientation.

17. The video monitor system of claim 16, wherein the at least one orientation sensor comprises at least two orientation detectors, the two orientation detectors together sensing which side of the video display is up.

18. A method of configuring a plurality of video monitors that each include at least one adjacent monitor detector receiver that senses the presence and position of adjacent video monitors with respect to the respective video monitor and at least one adjacent monitor detector transmitter that transmits a signal detectable by an adjacent monitor's adjacent monitor detector receiver, the method comprising:

directing a first monitor of the plurality of the video monitors to energize its adjacent monitor detector to transmit a signal;

inquiring of a second monitor whether its at least one adjacent monitor detector receiver is receiving a signal transmitted by the adjacent monitor detector of the first monitor; and if so, determining that the first and second monitors are both present and located adjacent to one another.

19. The method of claim 18, further comprising:

inquiring of a third monitor whether its at least one adjacent monitor detector receiver is receiving a signal transmitted by the at least one the adjacent monitor detector transmitter of the first monitor; and if so, determining that the first and second monitors are located adjacent to one another.

20. The method of claim 18, further comprising:

repeating the steps of directing and inquiring until a monitor arrangement is determined; and after the monitor arrangement is determined, reading from each monitor a resolution and an identification.

21. The method of claim 18, wherein each monitor includes at least one orientation detector, the method further comprising:

detecting within each monitor an orientation of the monitor; and reading from each monitor its orientation.

22. A system for detecting an arrangement of monitors, comprising:

a plurality of monitors, each comprising:

a display screen that displays an image;

an adjacent monitor system detector receiver disposed at a predetermined position with respect to the display screen and adapted to detect the presence and position of an adjacent video monitor with respect to the display screen in response to a signal received from the adjacent video monitor; and an adjacent monitor detector transmitter located at a second predetermined position with respect to the display screen, wherein the adjacent monitor detector transmitter transmits a signal detectable by a second, adjacent monitor's adjacent monitor detector receiver; and a computer coupled to the plurality of monitors, the computer including a driver to send and receive information from the adjacent monitor detector transmitters and receivers, the computer detecting an arrangement of the plurality of monitors based on the information received from the adjacent monitor detector transmitters and receivers.

23. A computer for detecting an arrangement of a plurality of monitors that each have adjacent monitor detector transmitters and receivers, the computer comprising:

a processor that executes instructions;

an interface that communicates with the adjacent monitor detector transmitters and receivers of the plurality of monitors; and a driver with code, that when executed, instructs over the interface an adjacent monitor detector transmitter of one of the plurality of monitor to transmit a signal and that determines over the interface whether any of the adjacent monitor system detector receivers of the remaining monitors of the plurality of monitors have received the signal, thereby indicating the presence of the one monitor and its position with respect to the remaining monitors.

* * * * *